United States Patent [19]

Achard

[11] 4,187,742

[45] Feb. 12, 1980

[54] CONTROL OF AN AUTOMATIC GEARBOX IN AN AUTOMOBILE

[75] Inventor: Michel Achard, La Garenne Colombes, France

[73] Assignee: Automobiles Peugeot, Paris, France

[21] Appl. No.: 808,518

[22] Filed: Jun. 21, 1977

[30] Foreign Application Priority Data

Jul. 2, 1976 [FR] France .................................. 76 20275

[51] Int. Cl.² ........................ B60K 23/00; B60K 41/18
[52] U.S. Cl. ........................................ 74/863; 74/856; 123/179 R
[58] Field of Search .................................. 74/856–860, 74/863; 123/117 A, 179 R

[56] References Cited

U.S. PATENT DOCUMENTS 3,882,739  5/1975  Eltze .................................... 74/863 X
4,034,626  7/1977  Udagawa et al. ....................... 74/857

*Primary Examiner*—C. J. Husar
*Assistant Examiner*—Frank McKenzie
*Attorney, Agent, or Firm*—Burns, Doane, Swecker & Mathis

[57] ABSTRACT

The present invention relates to a device for controlling an automatic gearbox provided with a load correction valve subjected to the vacuum prevailing in the inlet manifold of the internal combustion engine associated therewith, wherein the pipe conveying the vacuum, which acts on the load correction valve, comprises a venting by-pass circuit controlled by a valve which allows venting when the engine is cold.

4 Claims, 2 Drawing Figures

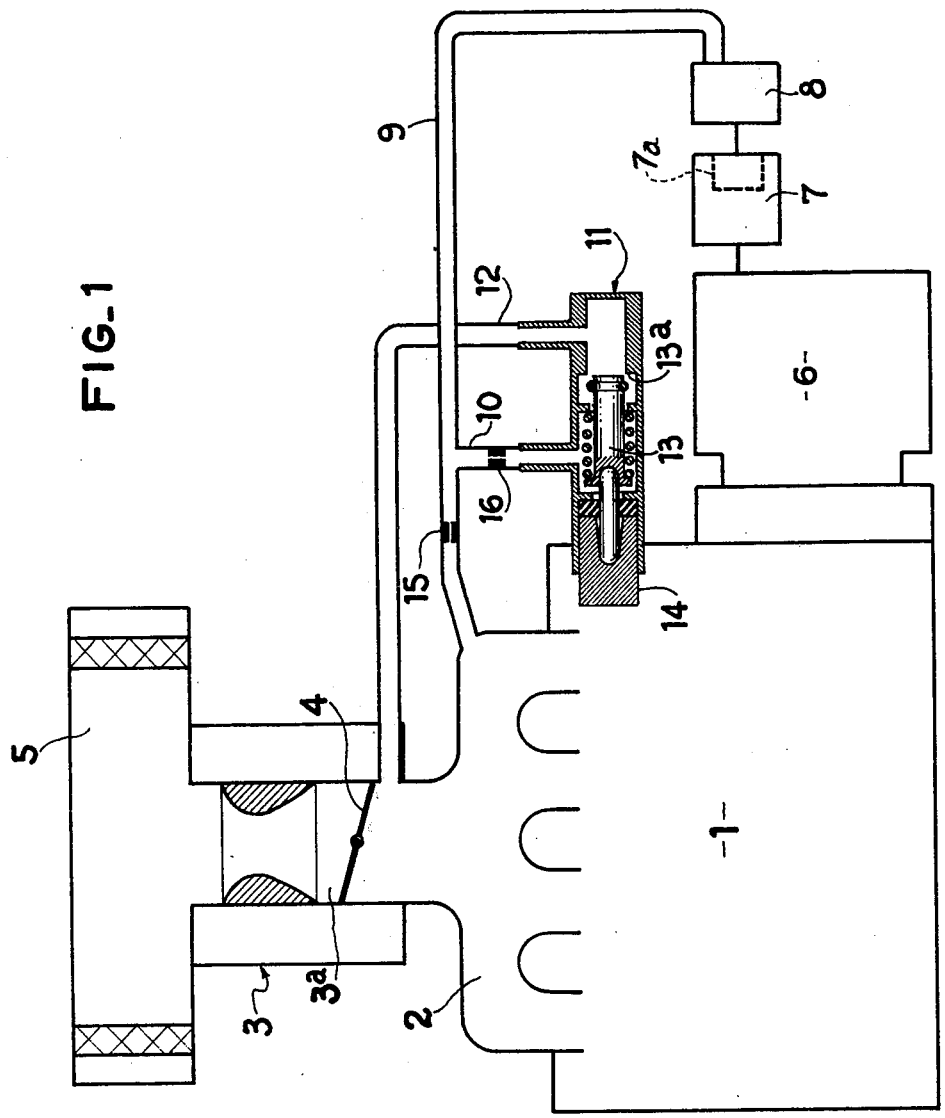
FIG_1

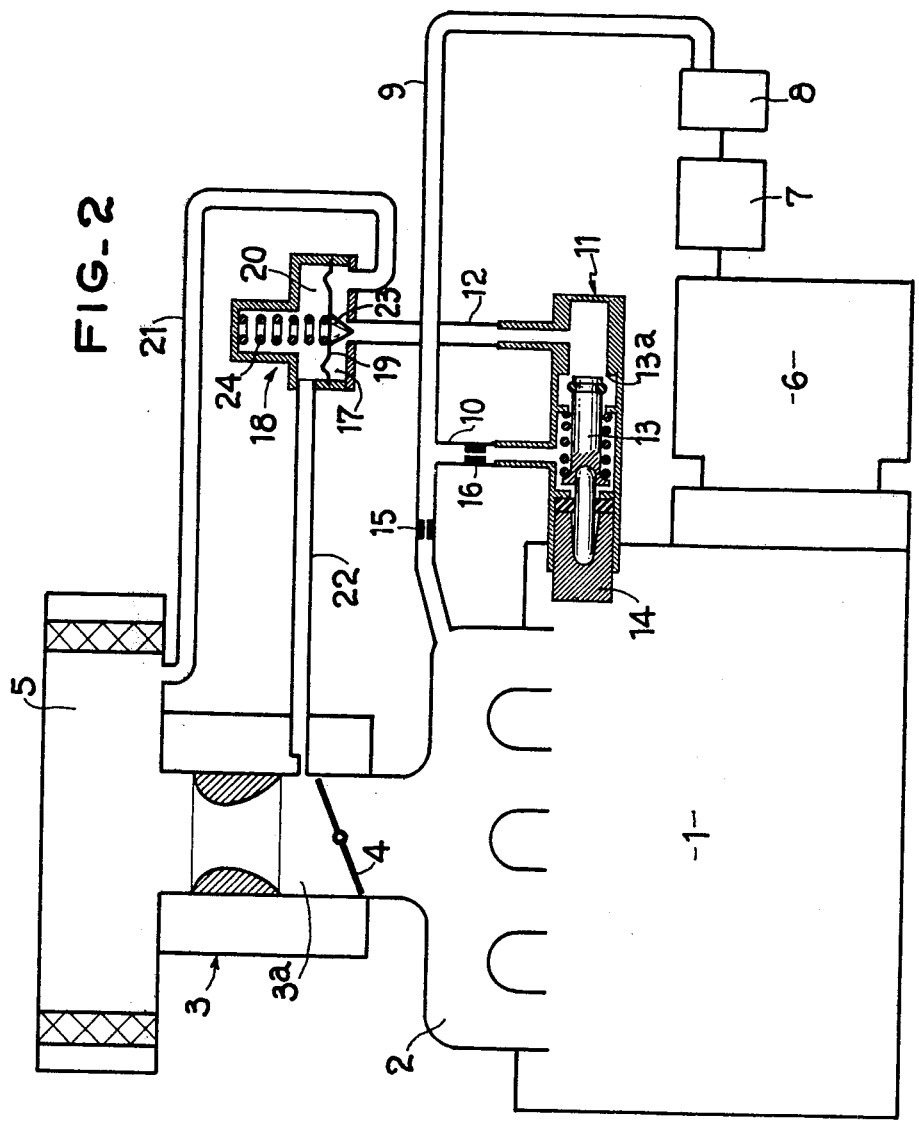
FIG_2

CONTROL OF AN AUTOMATIC GEARBOX IN AN AUTOMOBILE

The present invention relates to a device for controlling an automatic gear box provided with a load correction valve subjected to the vacuum prevailing in the inlet manifold of the internal combustion engine associated therewith.

In an automobile vehicle equipped with an automatic gear box, transmission gear shifting is known to be effected according to predetermined laws which take into account both the load of the engine and the speed of the vehicle. It is also known that a cold engine emits relatively more pollutant gases than a warm engine, in view of the use of a choke and of the inefficiency of the catalytic converters when cold.

It is an object of the invention to produce a control device which enables the temperature rise of the engine to be accelerated in order to reduce the emission of pollutants.

It, therefore, relates to a device for controlling an automatic gear box provided with a load correction valve subjected to the vacuum prevailing in the inlet manifold of the internal combustion engine associated therewith. An example of a device of this general type is disclosed in U.S. Pat. No. 4,034,626 and the disclosure of this patent is incorporated in this specification by reference.

In this known type of control device, the pipe conveying the vacuum, which acts on the load correction valve, comprises a venting branch circuit controlled by a thermostatic valve which allows venting the vacuum pipe when the engine is cold.

Due to this arrangement, the data supplied to the correction valve as a function of the load of the engine is modified so as to correspond to that which a greater load would normally give. The gear shifting is, therefore, produced, all things being otherwise equal, for a higher speed of revolution of the engine, as long as said latter has not reached a certain temperature.

Supplementary means are preferably provided for neutralizing the venting when the engine is idling.

In accordance with two embodiments of the invention:

the branch circuit opens into the inlet pipe immediately downstream of the throttle valve when the latter is in the idling position, with the engine cold;

the branch circuit opens through a pipe into a chamber at atmospheric pressure, for example the air filter associated with the carburettor, controlled by a valve subjected to the pressure transmitted by a pipe which opens into the inlet pipe immediately upstream of the throttle valve when the latter is in the idling speed position, with the engine cold.

The invention will be more readily understood on reading the following description with reference to the accompanying drawings, in which:

FIG. 1 shows an internal combustion engine in section, comprising the device according to the invention, and FIG. 2 is a view similar to FIG. 1, showing a second embodiment.

Referring now to the drawings, FIG. 1 schematically shows an internal combustion engine 1 with its inlet manifold 2, its carburettor 3 provided with an inlet pipe $3^a$ and a throttle valve 4 and its air filter 5. This engine 1 is operatively connected to an automatic gear box 6 whose gear shifting is controlled, in the known manner, by a control unit 7 comprising, in particular, a load correction valve $7a$ actuated by a vacuum responsive actuator 8. The latter is conventionally connected to the inlet manifold via a pipe 9.

This pipe 9 comprises a venting branch circuit comprising a pipe 10, a thermostatically controlled valve 11 and a pipe 12. The thermostatic valve 11 comprises a valve member 13 co-operating with a seat $13^a$ and actuated by a sensor element 14 subjected to the temperature of the cooling water of the engine 1. When this temperature is low, the valve member 13 opens the communication between the pipes 10 and 12. This communication is closed when the temperature of the water reaches a predetermined value.

A calibrated restrictor 15 is disposed in pipe 9 between the pipe 10 and the inlet manifold 2. Another calibrated restrictor 16 is disposed in pipe 10.

The pipe 12 is connected to the inlet pipe $3^a$, at a point immediately downstream of the throttle valve 4 when the latter is in the idling speed position, with a cold engine and the choke in action. This point of connection of pipe 12 is upstream of the throttle valve 4 as soon as the latter begins to open.

The device which has just been described operates as follows:

When the engine is warm, the valve 11 is closed, the valve member 13 being engaged with seat $13a$. The vacuum which prevails in the inlet manifold 2 acts normally on the actuator 8 which acts on the load correction valve $7a$ without the device according to the invention being used.

When the engine is cold, the valve 11 opens, placing pipes 10 and 12 in communication.

If the throttle valve 4 is at least partly open, the pipe 12 opens out into a zone subjected to a pressure close to atmospheric pressure. There is then a reduction of the vacuum in pipe 9, in a ratio which depends on the respective passage sections of the orifice. The actuator 8, therefore, receives data corresponding to an imaginary load greater than the real. This results, for given conditions of use, in an increase in the speed of the engine for which the transmission gear shifting is produced, and consequently, an increase in the speed of warming up of the engine, a reduction of the time during which the choke is used and an increase in the rise in temperature of the catalytic converters.

In this way, there is a reduction in the emission of pollutants, carbon monoxide and unburnt hydrocarbons.

When the engine, which is still cold, is idling, the pipe 12 opens downstream of the throttle valve 4 in a zone subjected to a vacuum similar to the one in which pipe 9 is subjected. There is then no modification of the vacuum acting on actuator 8, this avoiding the jerk which would be produced when passing from neutral position to drive position.

In the variant embodiment of FIG. 2, the pipe 12 terminates in a chamber 17 of a manometric actuator 18 divided by a supple membrane 19 into two chambers 17 and 20. Chamber 17 communicates with the air filter 5 via a pipe 21. The chamber 20 communicates with the inlet pipe $3^a$ via a pipe 22 which opens immediately upstream of the throttle valve 4 when the latter is in the idling speed position, with the engine cold and the choke in action. This point of connection is downstream of the throttle valve 4 as soon as said valve begins to open. The membrane 19 carries a needle valve 23 which tends to obturate the pipe 12 under the action of a spring 24.

The functioning of the second embodiment is similar to the preceding one:

When the engine is warm, the valve 11 is closed and the device according to the invention is not used.

When the engine is cold, the valve 11 opens, placing pipes 10 and 12 in communication:

if the throttle valve 4 is at least partly open, the pipe 22 opens into a zone subjected to a vacuum which acts on the membrane 19 to open the needle valve 23. A communication is then established with the atmosphere, from pipe 9, through pipe 10, valve 11, pipe 12, actuator 18, pipe 21 and the air filter 5. As in the previous example, there is, therefore, a reduction in the vacuum transmitted to the actuator 8 and increase in the speed of the engine for which the transmission gear shifting is produced.

When the engine, which is still cold, is idling, the pipe 22 opens upstream of the throttle valve 4 into a zone not subjected to vacuum, with the result that the needle valve 23 obturates pipe 12: there is, therefore, no reduction in the vacuum acting on the actuator 8.

Having now described my invention what I claim as new and desire to secure by Letters Patent is:

1. In a device combined with an automatic gearbox and an engine having an inlet pipe and a throttle valve in the inlet pipe for moving between an idling engine speed position and a full engine speed position, which device is for controlling the gearbox and comprises means defining a vacuum-responsive engine load correcting first valve which is adapted to vary engine loads at which speeds of the gearbox are automatically changed depending on the position of said valve, first passage means putting said valve in communication with the inlet pipe; the improvement comprising venting means for putting said first valve in communication with the atmosphere, the venting means comprising second passage means connected to the first passage means at a given connection and communicating with the atmosphere when the throttle valve is moved away from said idling engine speed position, a second valve inserted in the second passage means and responsive to the temperature of the engine for opening the second passage means when the engine is cold and closing the second passage means when the engine is warm, means for closing said second passage means off from the atmosphere when the throttle valve is in said idling engine speed position, calibrated restrictors respectively inserted in the first passage means between said given connection and the inlet pipe and in the second passage means between said given connection and the second valve, the first passage means being connected to the inlet pipe in a position to always communicate with the inlet pipe on the downstream side of the throttle valve relative to the fluid flow through the inlet pipe.

2. A device as claimed in claim 1, wherein said second passage means opens into the inlet pipe immediately downstream of the throttle valve when the throttle valve is in said engine idling speed position.

3. A device as claimed in claim 1, wherein said second valve is combined with the engine to be exposed to cooling fluid for the engine.

4. A device as claimed in claim 1, wherein said second passage means communicate permanently with the atmosphere at an end remote from the second valve and the device further comprises a third valve inserted in said second passage means between said remote end and the second valve, vacuum-responsive actuating means combined with the third valve for shifting the third valve to a position opening the second passage means when the actuating means is exposed to a vacuum, and third passage means putting the actuating means in communication with the inlet pipe in a position upstream of the throttle valve in said idling engine speed position of the throttle valve and downstream of the throttle valve when the throttle valve is moved away from the idling engine speed position of the throttle valve so as to shift the third valve to the position for opening the second passage means.

* * * * *